United States Patent
Hong et al.

(10) Patent No.: US 12,278,736 B2
(45) Date of Patent: Apr. 15, 2025

(54) NODE STATE DETERMINATION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Tao Hong, Beijing (CN); Dian Xiong, Beijing (CN); Chen Wang, Beijing (CN); Linxuan Shi, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/674,314

(22) Filed: May 24, 2024

(65) Prior Publication Data

US 2024/0314041 A1    Sep. 19, 2024

Related U.S. Application Data

(63) Continuation of application No. PCT/CN2022/129420, filed on Nov. 3, 2022.

(30) Foreign Application Priority Data

Nov. 26, 2021  (CN) .......................... 202111424211.4

(51) Int. Cl.
  *G06F 13/00* (2006.01)
  *H04L 41/12* (2022.01)
  *G06F 3/04842* (2022.01)

(52) U.S. Cl.
  CPC .......... *H04L 41/12* (2013.01); *G06F 3/04842* (2013.01)

(58) Field of Classification Search
  CPC ....... H04L 51/10; H04L 51/046; H04L 51/18; H04L 41/12; G06Q 10/107; H04M 1/72436; G06F 3/04842

(Continued)

(56) References Cited

U.S. PATENT DOCUMENTS

| 7,460,260 | B2* | 12/2008 | Garg ..................... G06F 3/1207 358/1.15 |
| 9,910,487 | B1 | 3/2018 | Abrams et al. |
| 2024/0314041 | A1* | 9/2024 | Hong .................. G06Q 10/103 |

FOREIGN PATENT DOCUMENTS

| CN | 104021460 A | 9/2014 |
| CN | 106548327 A | 3/2017 |

(Continued)

OTHER PUBLICATIONS

International Search Report and Written Opinion received for PCT Patent Application No. PCT/CN2022/129420, mailed on Jan. 28, 2023, 4 pages.

(Continued)

*Primary Examiner* — Kenneth R Coulter

(57) ABSTRACT

Embodiments of the present disclosure provide a node state determination method and apparatus, an electronic device, and a storage medium. The method includes: determining node attribute information of a linkage process node in response to determining a current process node as the linkage process node; determining at least one third-party platform based on the node attribute information, and sending task information corresponding to the linkage process node to the at least one third-party platform, such that the at least one third-party platform processes the task information; and receiving feedback information from the at least one third-party platform, and updating a node state of the current process node to a target state based on the feedback information.

20 Claims, 4 Drawing Sheets

(58) Field of Classification Search
USPC .................. 709/221, 220, 206, 223; 718/100
See application file for complete search history.

(56) References Cited

FOREIGN PATENT DOCUMENTS

| | | | |
|---|---|---|---|
| CN | 106897810 | A | 6/2017 |
| CN | 109670726 | A | 4/2019 |
| CN | 109767320 | A | 5/2019 |
| CN | 109819020 | A | 5/2019 |
| CN | 109858727 | A | 6/2019 |
| CN | 110018860 | A | 7/2019 |
| CN | 110610315 | A | 12/2019 |
| CN | 112036736 | A | 12/2020 |
| CN | 112100193 | A | 12/2020 |
| CN | 112749954 | A | 5/2021 |
| CN | 113296906 | A | 8/2021 |

OTHER PUBLICATIONS

Search Report received from Chinese patent application No. 202111424211.4 mailed on Apr. 22, 2023, 1.
Extended European Search Report for European Application No. 22897571.0, mailed Jan. 23, 2025, 8 pages.

\* cited by examiner

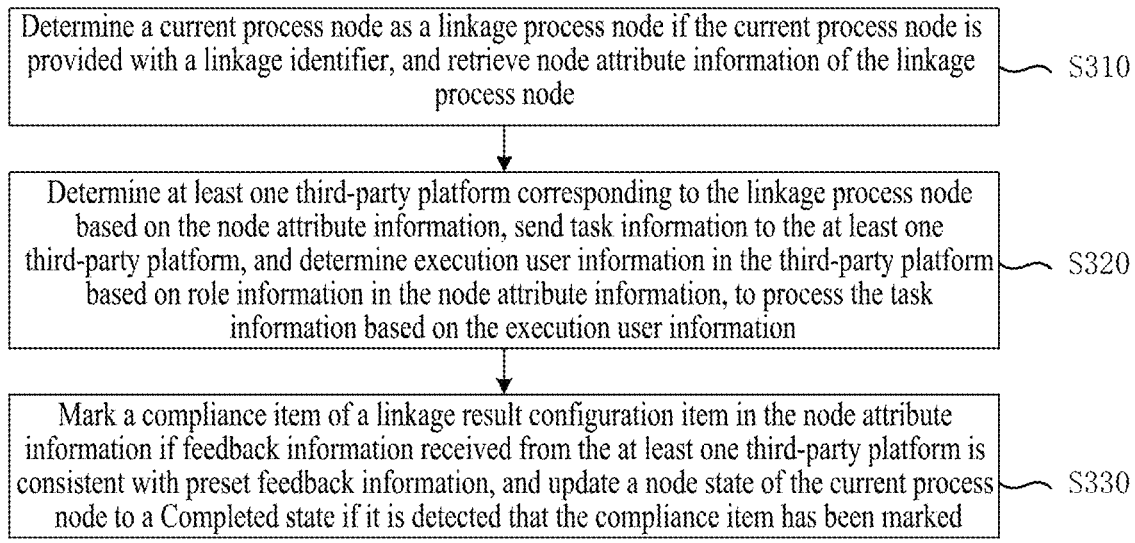

Figure 5

| Determine a current process node as a linkage process node if the current process node is provided with a linkage identifier, and retrieve node attribute information of the linkage process node | ~ S310 |

↓

| Determine at least one third-party platform corresponding to the linkage process node based on the node attribute information, send task information to the at least one third-party platform, and determine execution user information in the third-party platform based on role information in the node attribute information, to process the task information based on the execution user information | ~ S320 |

↓

| Mark a compliance item of a linkage result configuration item in the node attribute information if feedback information received from the at least one third-party platform is consistent with preset feedback information, and update a node state of the current process node to a Completed state if it is detected that the compliance item has been marked | ~ S330 |

Figure 6

NODE STATE DETERMINATION METHOD AND APPARATUS, ELECTRONIC DEVICE, AND STORAGE MEDIUM The present application is a Continuation Application of International Patent Application No. PCT/CN2022/129420, filed Nov. 3, 2022, which claims priority to Chinese Patent Application No. 202111424211.4, filed with the China National Intellectual Property Administration on Nov. 26, 2021, which are incorporated herein by reference in their entireties.

TECHNICAL FIELD

Embodiments of the present disclosure relate to the field of computer technologies, and for example, to a node state determination method and apparatus, an electronic device, and a storage medium.

BACKGROUND ART

At present, when carrying out a service according to requirements of the market or users, to sort out and plan specific work content of the service, an enterprise needs to first build a corresponding project flow for the service in a project process management platform, and then clarify work content in a plurality of sections through the built project flow.

In the related art, during a service promotion process, work in some sections may need to be completed at a third-party platform. However, in the original project process management platform, these sections cannot be directly driven by a processing result of the third-party platform. Instead, after a related responsible person at the third-party platform completes the work, a processing result also needs to be repeatedly recorded in the original project process management platform, which makes the process very complicated, reducing the efficiency of project promotion.

SUMMARY OF THE INVENTION

The embodiments of the present disclosure provide a node state determination method and apparatus, an electronic device, and a storage medium, which enable a third-party platform to directly drive a related node of an original project process management platform, and implement cross-system linkage between a plurality of platforms.

According to a first aspect, an embodiment of the present disclosure provides a node state determination method, the method including:
  determining node attribute information of a linkage process node in response to determining a current process node as the linkage process node;
  determining at least one third-party platform based on the node attribute information, and sending task information corresponding to the linkage process node to the at least one third-party platform, such that the at least one third-party platform processes the task information; and
  receiving feedback information from the at least one third-party platform, and updating a node state of the current process node to a target state based on the feedback information.

According to a second aspect, an embodiment of the present disclosure further provides a node state determination apparatus, the apparatus including:
  a node attribute information determination module configured to determine node attribute information of a linkage process node in response to determining a current process node as the linkage process node;
  a third-party platform determination module configured to determine at least one third-party platform based on the node attribute information, and send task information corresponding to the linkage process node to the at least one third-party platform, such that the at least one third-party platform processes the task information; and
  a node state update module configured to receive feedback information from the at least one third-party platform, and update a node state of the current process node to a target state based on the feedback information.

According to a third aspect, an embodiment of the present disclosure further provides an electronic device. The electronic device includes:
  one or more processors; and
  a storage apparatus configured to store one or more programs,
  where the one or more programs, when executed by the one or more processors, cause the one or more processors to implement the node state determination method as described in any one of the embodiments of the present disclosure.

According to a fourth aspect, an embodiment of the present disclosure further provides a storage medium including computer-executable instructions that, when executed by a computer processor, are configured to perform the node state determination method as described in any one of the embodiments of the present disclosure.

BRIEF DESCRIPTION OF DRAWINGS

Throughout the drawings, the same or similar reference numerals denote the same or similar elements. It should be understood that the accompanying drawings are schematic and that parts and elements are not necessarily drawn to scale.

FIG. 5 shows a node attribute information edit page for a linkage process node according to an embodiment of the present disclosure;

FIG. 6 is a schematic flowchart of a node state determination method according to another embodiment of the present disclosure;

DETAILED DESCRIPTION OF THE INVENTION

It should be understood that the multiple steps described in method implementations of the present disclosure may be performed in different orders, and/or performed in parallel. Furthermore, additional steps may be included and/or execution of the illustrated steps may be omitted in the method implementations. The scope of the present disclosure is not limited in this respect.

The term "include/comprise" used herein and variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish between different apparatuses, modules, or units, and are not used to limit the sequence or interdependence of functions performed by these apparatuses, modules, or units.

It should be noted that the modifiers "a/an" and "a plurality of" mentioned in the present disclosure are illustrative and not restrictive, and a person skilled in the art should understand that unless the context clearly indicates otherwise, the modifiers should be understood as "one or more".

Figure 1:
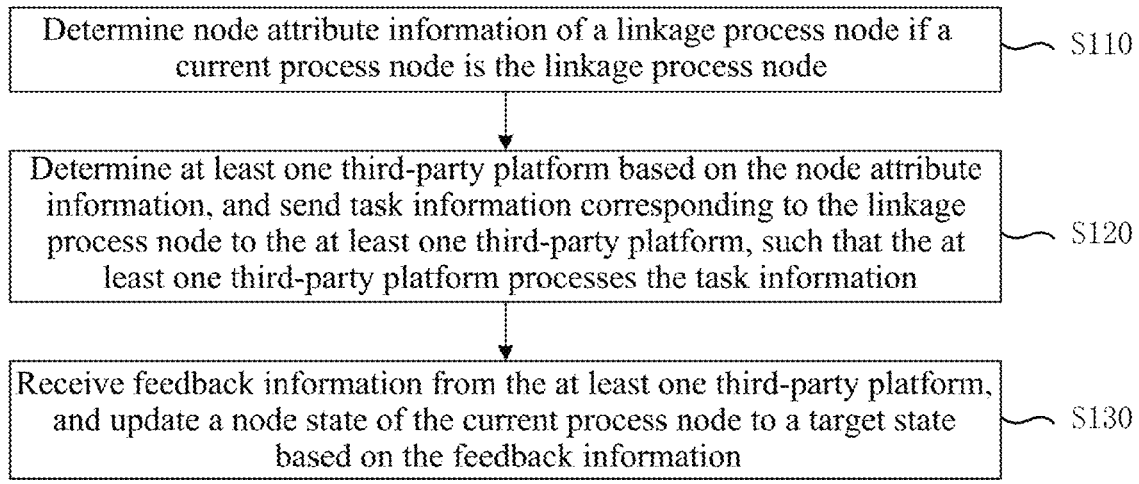
FIG. 1 is a schematic flowchart of a node state determination method according to an embodiment of the present disclosure.

FIG. 1 is a schematic flowchart of a node state determination method according to an embodiment of the present disclosure. This embodiment is applicable to a case in which a node in a project flow that needs to be linked with a third-party platform is handled based on a project process management platform in the related art. The method may be performed by a node state determination apparatus. The apparatus may be implemented in the form of software and/or hardware. The hardware may be an electronic device, such as a mobile terminal, a PC, or a server.

Before this technical solution is described, an exemplary illustration of an application scenario may be given. This technical solution may be applied to any scenario in which a node in a project flow that needs to be linked with a third-party platform is handled based on a project process management platform in the related art. For example, work in some sections in a project flow created for a certain project needs to be handled by a related user dependent on a third-party platform, and then a processing result is repeatedly written into an original platform. In this case, based on this technical solution, nodes corresponding to the above sections are automatically determined in the project flow and node attribute information of the nodes is obtained, a work task is then sent to the third-party platform based on the node attribute information, and finally, automated cross-system linkage for handling of project flow nodes is implemented based on feedback from the third-party platform.

As shown in FIG. 1, the method in this embodiment includes the following steps.

S110: Determine node attribute information of a linkage process node if a current process node is the linkage process node.

For a project set up by an enterprise for a specific product or service, a related worker needs to build a corresponding project flow for actual work content of the project, thereby controlling a plurality of sections in the project after the project is carried out. For example, the enterprise may develop a corresponding project process for an Internet product, including a plurality of stages such as project startup, compliance evaluation, development testing, and launching. For each of the stages, there is specific work content associated therewith.

In this embodiment, a digital carrier of the project process is a project flow. It may be understood that the project flow may reflect at least the plurality of working stages in the project process and an association between the plurality of working stages. During an actual application process, the project flow may be generated in a specific platform or system according to a project process management need. For example, with the help of the platform or system configured to generate the project flow, the related worker may divide an overall plan of the project into a plurality of stages according to a specific division rule, so as to generate the project flow in the form of a flowchart, and then store the generated project flow in specific storage space for invocation when the project flow is displayed or processed on a specific page.

For example, the project flow generated in the platform or the system includes a plurality of process nodes. A person skilled in the art should understood that each of a plurality of stages of an actual project may be associated with a specific executor and a main idea corresponding to execution content in this stage. In the project flow, carriers of information associated with the forgoing plurality of stages are the plurality of process nodes. In addition, one process node may correspond to a specific stage in the project, or may correspond to a specific step in a single stage of the project. For example, process nodes of a specific project include a requirement presentation node, a review node, a compliance evaluation node, a development node, a test node, and a publication node. The requirement presentation node, the review node, and the compliance evaluation node correspond to a startup stage of the project, the development node and the test node correspond to a development testing stage of the project, and the publication node corresponds to a launching stage of the project.

During a project promotion process, work in some sections may require introduction of a third-party platform. For example, when the project process flows to this section, a corresponding work task needs to be completed by a related responsible person based on the third-party platform, and a processing result is returned from the third-party platform to an original project process management platform or system. Based on this, for a project flow built in the original project process management platform or system, process nodes corresponding to these sections are linkage process nodes. It may be understood that when a specific node in the project flow is used as a linkage process node, it may at least indicate that a work task corresponding to this node needs to be processed by a user based on a specific third-party platform. It should be noted that there may be one or more linkage process nodes, and whether a process node is a linkage process node depends on whether a work task corresponding to the node needs to be completed based on a third-party platform. Still using the above example for illustration, for the requirement presentation node, the review node, the development node, the test node, and the publication node, a responsible person in each section may process a related work task based on the original project process management platform or system. However, for the compliance evaluation node, a compliance evaluation task corresponding to the node needs to be completed by an evaluation team using the third-party platform, and therefore, the node is the linkage process node.

In this embodiment, a plurality of process nodes in a current project process management platform or system may be traversed manually or automatically, to determine a linkage process node from the plurality of process nodes. For example, the platform or system may automatically detect whether a plurality of nodes in a current project flow carry a linkage tag, and then determine a node carrying the linkage tag as the linkage process node. A person skilled in the art should understand that the linkage process node is determined in a plurality of manners, which is not specifically limited in the embodiments of the present disclosure.

In this embodiment, a node information edit page may be developed and deployed in advance in the original project process management platform or system for building the project flow.

For example, after a project flow corresponding to a specific project is displayed on a specific page, when it is detected that the user selects a specific process node in the project flow, the display of a corresponding node information edit page may be triggered. It may be understood that node attribute information of the process node is displayed on the node information edit page. In addition, the page provides an edit function for the node attribute information. The node attribute information may be information that reflects workers and work content in a plurality of stages of the project. For example, the node attribute information may include information in a plurality of dimensions such as a node identifier, a node name, a collaborating user of the node, an execution duration of the node, an operation type of the node, a node event, and the linkage tag.

It should be noted that based on the node attribute information, the current project process management platform or system may not only determine whether the plurality of nodes are linkage process nodes, but can also determine information related to a third-party platform involved in the node. Still using the above example for illustration, after determining the compliance evaluation node as a linkage process node, the platform or system may also determine a team responsible for performing compliance evaluation on the project and a third-party platform used by the team to evaluate whether the project is compliant and generate a related report.

S120: Determine at least one third-party platform based on the node attribute information, and send task information corresponding to the linkage process node to the at least one third-party platform, such that the at least one third-party platform processes the task information.

In this embodiment, after the linkage process node in the project flow and the node attribute information corresponding to the linkage process node are determined, the third-party platform for processing a work task of the node may be determined. The third-party platform may be a platform that communicates and interacts with the current project process management platform. In addition, as a tool for processing a related work task of the project, the third-party platform also serves to facilitate communication, collaboration, and integration between development, technical operation, and quality assurance departments. It may be understood that the third-party platform may not only implement data processing and instruction transmission in a system of the third-party platform, but can also communicate and interact with an external platform or system. It should be understood that for a single linkage process node, there may be one or more third-party platforms involved in the node, and the specific number thereof depends on the specific work content corresponding to the node.

In this embodiment, after one or more third-party platforms corresponding to the linkage process node are determined for the node, the task information corresponding to the node needs to be sent to the third-party platform in order to implement cross-system linkage of the project flow. A person skilled in the art should understand that the task information corresponding to the node may be content (such as the execution duration of the node and the node event) in the node attribute information, or may be a document file or multimedia information transmitted to the node based on the current project flow. The specific task information should be selected according to actual situations, which is not specifically limited in the embodiments of the present disclosure. For example, after receiving the task information corresponding to the linkage process node, the at least one third-party platform may process a work task corresponding to the node manually or automatically.

Still using the above example for illustration, when it is determined that the compliance evaluation node in the project flow is the linkage process node, and node attribute information of the node is determined, task information and a file to be evaluated may be sent to a corresponding third-party platform. After logging on to the third-party platform, the evaluation team may evaluate, based on the platform, the file to be evaluated, and give a corresponding evaluation report.

A person skilled in the art should understand that work of the user for processing the task information corresponding to the linkage process node based on the third-party platform may be performed according to project management requirements and actual work content, which is not limited to the manner of "evaluating the file and giving an evaluation report" in the above example.

S130: Receive feedback information from the at least one third-party platform, and update a node state of the current process node to a target state based on the feedback information.

In this embodiment, after performing a corresponding processing operation based on the task information corresponding to the linkage process node, the at least one third-party platform also needs to feed back a processing result in order to implement cross-system linkage of the project flow. For example, processing results generated in the third-party platform may be integrated and stored, and a processing result is then fed back to the original project process management platform or system.

The original project process management platform or system may set node states for the plurality of process nodes in the project flow. It may be understood that state information of the plurality of nodes in the project flow is used to reflect the progress of the project and the completion of the work task in this section. For example, identifiers representing node state information may be set for the plurality of nodes. For example, a circle identifier with a check mark indicates that the task or event corresponding to the node has been completed and has been approved by a related authorized user; a black circle identifier indicates that the task or event corresponding to the node has not been completed and has exceeded a pre-allocated work period for the task or event, and should be given priority attention; a circle identifier filled with slash lines indicates that the task or event corresponding to this node is currently executed in the project; and a gray circle identifier indicates that an execution process of the project has not flowed to this node, that is, a task or event corresponding to a previous node associated with this node has not been completed, and the task or event corresponding to this node cannot be triggered.

In this embodiment, after receiving the feedback information from the third-party platform, the original project process management platform may update the node state of the linkage process node based on the feedback information. It may be understood that a node state obtained after updating based on the feedback information is the target state of the linkage process node. Still using the above example for illustration, after performing evaluation processing on the file to be evaluated of the project at the third-party platform, the evaluation team may give an evaluation report, generate a key field in the form of "Evaluated, Project compliant" or "Evaluated, project not compliant", and then feed back to the original project process management system the evaluation report and the key field as feedback information. The original platform or system may update the node state of the compliance evaluation node based on the received feedback information, that is, updating an "In progress" node state of the compliance evaluation node to a "Completed" node state. In addition, when the received feedback information includes the key field "Evaluated, project compliant", the work of the project may be driven based on the key field to trigger a work task of a next node (that is, the development node). When the received feedback information includes the key field "Evaluated, project not compliant", the flow of the work tasks of the project may be directly terminated.

It should be noted that for the linkage process node in the original project process management platform or system, the time of receiving the feedback information and a triggering mechanism may be set according to actual situations. Similarly, the target state of the node that is obtained through updating based on the feedback information may also be configured according to project management requirements, which is not specifically limited in the embodiments of the present disclosure.

According to the technical solution of this embodiment, if the current process node is the linkage process node, the node attribute information of the linkage process node is determined to clarify work content related to the service in this section; the at least one third-party platform is determined based on the node attribute information, and the task information corresponding to the linkage process node is sent to the at least one third-party platform, such that the at least one third-party platform processes the task information; and the feedback information is received from the at least one third-party platform, and the node state of the current process node is updated to the target state based on the feedback information, such that work information is transmitted and synchronized between a plurality of platforms in an automated manner. This not only enables the third-party platform to directly drive the related node of the original project process management platform to implement cross-system linkage between the plurality of platforms, but also avoids a complex process of the user performing repeated switching between the plurality of platforms and inputting information a plurality of times when processing the task, thereby improving the efficiency of project promotion.

Figure 2:
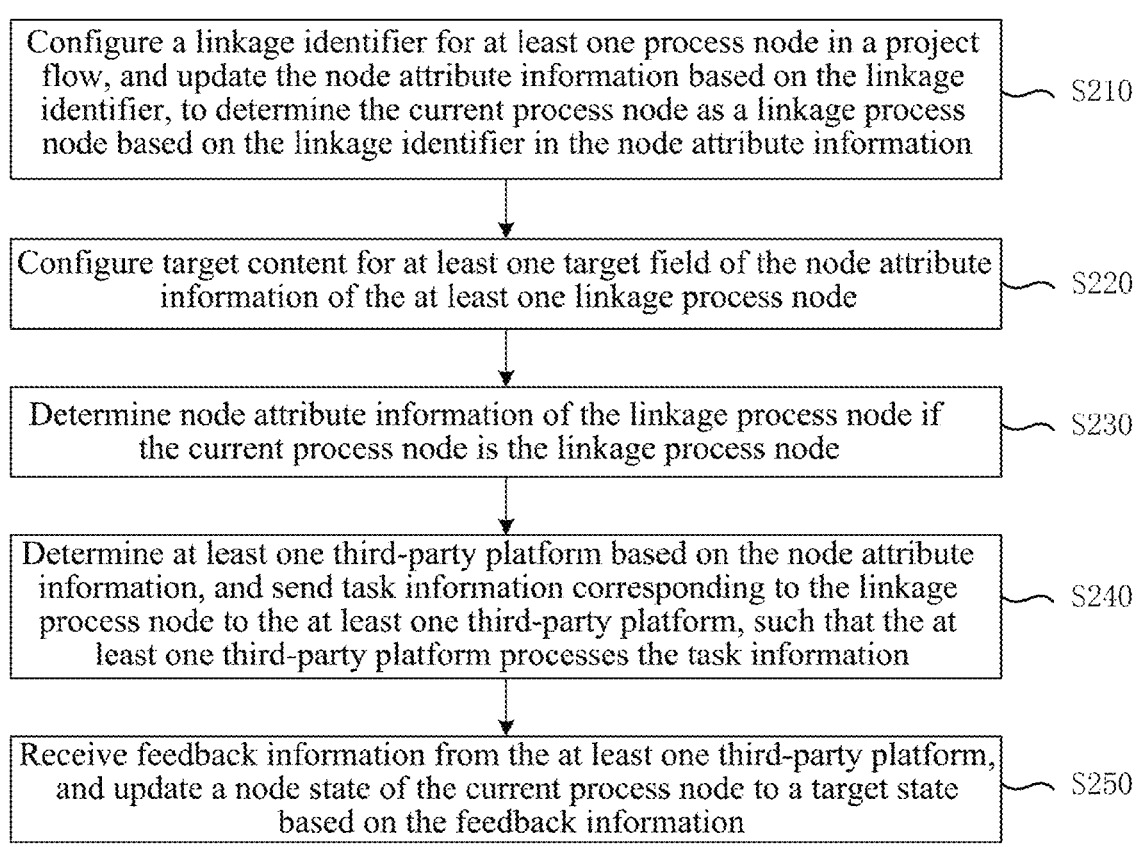
FIG. 2 is a schematic flowchart of a node state determination method according to Embodiment 2 of the present disclosure.

FIG. 2 is a schematic flowchart of a node state determination method according to another embodiment of the present disclosure. Based on the foregoing embodiment, before the project is officially carried out, a process node involving a third-party platform is configured based on a control and a field that are provided by the original project process management platform, so that the original platform can be linked with a third-party system during a project promotion process. During a configuration process, evaluation switches are configured in batch for a plurality of process nodes, which implements integration of setting functions of the plurality of process nodes, and improves the processing efficiency of the project flow in a configuration stage. For an example implementation of the method, reference may be made to the technical solution of this embodiment. The technical terms the same as or corresponding to those in the above embodiment are not described herein again.

As shown in FIG. 2, the method includes the following steps.

S210: Configure a linkage identifier for at least one process node in a project flow, and update the node attribute information based on the linkage identifier, to determine that the current process node is the linkage process node based on the linkage identifier in the node attribute information.

In this embodiment, to implement cross-system linkage of work tasks of process nodes in the original project process management platform or system, before a project is officially carried out (that is, work tasks corresponding to a plurality of process nodes in the project flow are executed), a process node involving a third-party platform first needs to be configured. The original project process management platform may provide the user with a channel for manually or automatically configuring the linkage identifier for a related node. It may be understood that the linkage identifier represents that a work task corresponding to the node needs to be processed by a related person based on the third-party platform. A detailed illustration of an information edit page for configuring the linkage identifier for the process node in the original project process management platform is given below with reference to FIG. 3.

Figure 3:
FIG. 3 shows an information edit page for configuring a linkage identifier for a node according to an embodiment of the present disclosure.

Referring to FIG. 3, during a process of configuring a linkage identifier for at least one process node in a project flow, an evaluation switch may be configured for the at least one process node; and a state of the evaluation switch may be adjusted to a first state, and the first state may be used as the linkage identifier.

For example, after an information edit page shown in FIG. 3 is entered through a requirement management function in the original project process management platform, not only can a node name, a related description, and a requirement document of this node be edited, but the linkage identifier of the node can also be configured through the evaluation switch provided by the platform. The evaluation switch is a control that decides whether a work task corresponding to the process node needs to be processed based on a third-party platform. For essential work content of the project, the evaluation switch is used to decide whether the work task in this section requires security compliance evaluation processing of the evaluation team, to avoid a related risk for the enterprise during the project promotion process, enhancing a security system of the enterprise. As a package of data and a method, the control at least serves to set the linkage identifier for the node or remove the linkage identifier from the node. It may be understood that when the evaluation switch is activated, the platform labels the process node with the linkage identifier, representing that the work task of the node requires the introduction of a third-party platform for evaluation processing; or when the evaluation switch is deactivated, the platform does not label the process node with the linkage identifier or removes the linkage identifier that the node has carried, representing that the work task of the node does not require the introduction of the third-party platform for evaluation processing.

During an actual application process, an activated-state of the evaluation switch may be used as the first state. In other words, when the process node is in the first state, the work task corresponding to the node requires the introduction of the third-party platform for security compliance evaluation processing. In addition, in the original project process management system, program code (for example, "docking identifier=legal") corresponding to the activated-state of the evaluation switch in the background may be used as the linkage identifier of the process node.

In this embodiment, during the process of configuring the linkage identifier for the at least one process node in the project flow, evaluation switches may also be configured for a plurality of process nodes on the information edit page. For example, the at least one process node is selected through a trigger operation on a checkbox control in a display interface; and the evaluation switch is configured for the at least one process node, the state of the evaluation switch is adjusted to the first state, and the first state is used as the linkage identifier. A detailed illustration of a page for configuring switches in batch through the checkbox control is given below with reference to FIG. 4.

Figure 4:
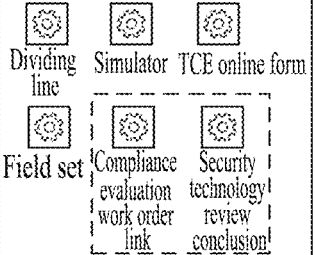
FIG. 4 shows a page for configuring switches in batch through a checkbox control according to an embodiment of the present disclosure.

Referring to FIG. 4, after an information edit page shown in FIG. 4 is entered through the requirement management function in the original project process management platform, the user may also perform a selection operation on the plurality of process nodes through the checkbox control developed by the platform. As shown in FIG. 4, the user may select a security compliance evaluation node and a security technology review node at the same time based on the checkbox control or switch. After the original project process management platform detects a check trigger operation of the user, a plurality of process nodes selected by the user may be adaptively displayed on a corresponding information edit page, and evaluation switches (that is, a security compliance evaluation switch and a security technology review switch in the figure) are then configured for the plurality of process nodes. It may be understood from the descriptions of FIG. 3 that when both the security compliance evaluation switch and the security technology review switch in FIG. 4 are activated, it indicates that the process node is in the first state, and during subsequent promotion of the project, the project requires at least security compliance evaluation processing that is based on a third-party platform and security technology review processing that is based on the same or another third-party platform.

In this embodiment, the evaluation switches may be configured in batch for the plurality of process nodes, which implements integration of setting functions of the plurality of process nodes, and improves the processing efficiency of the project flow in a configuration stage.

In this embodiment, after a linkage identifier is configured for one or more process nodes based on an evaluation switch in the original project process management platform, node attribute information of the process node may be updated based on a program field that is used as the linkage identifier in the background. Based on this, during the subsequent promotion of the project, when the work task flows to the process node, the platform may determine that the node is the linkage process node based on updated node attribute information.

S220: Configure target content for at least one target field of the node attribute information of the at least one linkage process node.

In this embodiment, after a process node for which evaluation processing needs to be performed based on a third-party platform is labeled with the linkage identifier in the original project process management platform and is then used as the linkage process node, a target field in node attribute information of the linkage process node also needs to be configured based on the original project process management platform, in order to implement specific data and information transfer during a cross-platform linkage process. For example, a node name field, a node form field, and a link field included in the target field in the node attribute information may be edited. A process of editing target content edit process is illustrated with reference to a page for configuring the node attribute information of the linkage process node in FIG. 5.

Referring to FIG. 5, based on the node attribute information edit page for the linkage process node, node name information may be added to the node name field; a linkage result configuration item may be set for the node form field, to determine a configuration choice for the result configuration item based on the feedback information from the at least one third-party platform; and at least one third-party platform link may be set for the link field, to jump to a corresponding third-party platform based on the at least one third-party platform link and determine execution user information based on role information in the third-party platform link.

For example, the node name reflects an event of the project that needs to be completed at this node, and may be a key field. "Security technology review" as shown in FIG. 5 represents that work of the project that is related to security technology review needs to be completed in this stage, and stages of the project are named to facilitate direct display of a project task stage corresponding to the node to the user and also facilitate interaction between the user and the platform or system that generates the project flow.

The node form includes content related to a linkage result of the node. Configuring content of the node form can at least enable the node to determine a processing result of the work task based on the feedback information from the third-party platform. As shown in FIG. 5, a person responsible for a security technology review work task may be configured in the node form, indicating which user processes the task. It may be understood that in this embodiment, the person responsible for the task is an execution user, and information filled in a responsible person field is execution user information. In addition, a review result received during the subsequent promotion of the project may be imported into a "Security technology review conclusion" configuration item (when the review conclusion is not imported, "In progress" may be displayed in a related status bar).

For example, a security technology work order link may also be configured based on the attribute information edit page for the linkage process node. It may be understood that the link is a connection to the third-party platform, indicating based on which platform the task needs to be processed and with which third-party platform the original project process management platform needs to communicate and interact (when the third-party platform is not determined, "To be evaluated" may be displayed in the related status bar). For example, after a link field is configured for a security technology review task, during the subsequent promotion of the project, when a project requirement is determined, a plurality of files to be reviewed are generated, and the process flows to the security technology review node, the original project process management platform may determine, based on the link field of the linkage process node, the third-party platform for executing the review task, and then automatically jump to the third-party platform. In addition, the plurality of files to be reviewed are transmitted to the third-party platform, and a user specified by the item "Person responsible for security technology review" reviews the related file.

S230: Determine node attribute information of a linkage process node if a current process node is the linkage process node.

S240: Determine at least one third-party platform based on the node attribute information, and send task information corresponding to the linkage process node to the at least one third-party platform, such that the at least one third-party platform processes the task information.

S250: Receive feedback information from the at least one third-party platform, and update a node state of the current process node to a target state based on the feedback information.

According to the technical solution of this embodiment, before the project is officially carried out, a process node involving a third-party platform is configured based on a control and a field that are provided by the original project process management platform, so that the original platform can be linked with a third-party system during the project promotion process. During a configuration process, evaluation switches are configured in batch for a plurality of process nodes, which implements integration of setting functions of the plurality of process nodes, and improves the processing efficiency of the project flow in a configuration stage.

FIG. 6 is a schematic flowchart of a node state determination method according to another embodiment of the present disclosure. Based on the foregoing embodiments, in the project promotion stage, the linkage process node is identified and the corresponding node attribute information is retrieved, for example, to determine the third-party platform related to the node, the work task of the node is processed with reliance on the third-party platform, and finally, a compliance item is marked based on feedback from the third-party platform, to implement cross-system linkage for related compliance evaluation work. For an example implementation of the method, reference may be made to the technical solution of this embodiment. The technical terms the same as or corresponding to those in the above embodiment are not described herein again.

As shown in FIG. 6, the method includes the following steps.

S310: Determine the current process node as the linkage process node in response to determining that the current process node is provided with a linkage identifier; and retrieve the node attribute information of the linkage process node.

In this embodiment, after building the corresponding project flow for the project and configuring the plurality of linkage process nodes based on the solution in Embodiment 2 of the present disclosure, the original project process management platform or system may carry out the project based on a task flow node in the project flow, and promote work of the project in a plurality of sections. When a task flows to a specific task flow node, the task flow node may be used as a current node. In addition, for the original project process management platform or system, a current task flow node in the project flow is the current process node.

In this embodiment, upon determination of the current process node based on the promotion of the project, the original project process management platform or system may determine whether the node is the linkage process node based on the configuration of an evaluation switch for the node in the configuration stage. For example, when the process node activates the security compliance evaluation switch in the configuration stage, the original project process management platform may determine, based on a program field of the switch in the background, that the process node is the linkage process node. In other words, a work task corresponding to the node needs to be evaluated and processed by a related person based on the third-party platform.

For example, after it is determined that the current process node is the linkage process node, node attribute information of the linkage process node also needs to be retrieved, in order to identify the third-party platform on which the work task of the node depends. It can be learned from the solution in Embodiment 2 of the present disclosure that when the process node is the linkage process node, the node attribute information of the linkage process node includes at least one third-party platform associated with the current process node.

S320: Determine at least one third-party platform corresponding to the linkage process node based on the node attribute information; and send the task information to the at least one third-party platform, and determine execution user information in the third-party platform based on role information in the node attribute information, to process the task information based on the execution user information.

In this embodiment, after retrieval of the node attribute information of the linkage process node, the original project process management platform may determine an address of the third-party platform based on the link field in the node attribute information, and then send task information corresponding to the node to the third-party platform. In addition, based on the information about the role in the node attribute information, an execution user allocated to the work task corresponding to the node in the configuration stage may be determined, that is, which user or team processes the work task in this section of the project at the third-party platform may be determined.

For example, after the third-party platform that processes a security compliance evaluation task of the project is determined, a file to be evaluated that is related to the project may be sent to a server associated with the third-party platform, and a jump is made from the original project process management platform to the third-party platform. In addition, an identifier of an enterprise evaluation team may be determined based on the role information in the node attribute information, and the evaluation team is then used as an executor of the security compliance evaluation task, that is, the evaluation team evaluates and reviews the related file at the third-party platform.

S330: Mark a compliance item of a linkage result configuration item in the node attribute information if the feedback information received from the at least one third-party platform is consistent with preset feedback information; and update the node state of the current process node to a completed state if it is detected that the compliance item has been marked.

In this embodiment, after the execution user completes processing of the related task of the linkage process node with reliance on the third-party platform, and obtains a processing result, the feedback information may be generated based on the processing result and then fed back to the original project process management platform or system. In addition, one or more types of feedback information may be preset in the original platform. The information is not only used to reflect one or more possible processing results of the work task of the node, but also used to match with the feedback information actually received.

For example, if the original platform determines, through the match with the feedback information, that the received feedback information is consistent with the preset feedback information, the compliance item in the linkage result configuration item may be marked. The compliance item in the linkage result is an item that represents whether the evaluation result is compliant. Through this item, whether the work task of the node is completed may be determined, and the node state may also be updated.

For example, for the security compliance evaluation node used as the linkage process node, a linkage result configuration item of the security compliance evaluation node may be a compliance state information display box pre-developed in the platform. When the received feedback information "Evaluated, project compliant" is consistent with the preset feedback information "Evaluated, project compliant", information "Evaluation successful" may be displayed in the compliance state information display box, to implement marking of the evaluation task. For example, the original project process management platform may update a node state of the security compliance evaluation node through the mark in the compliance state information display box, that is, updating the node state from the "In progress" state to the "Completed" state.

In contrast, if the received feedback information is inconsistent with the preset feedback information, the node state is not updated, and a prompt is given to the user, for example, prompt information such as "Security compliance evaluation fails" is displayed on a related page of the original project process management platform.

It should be noted that for the linkage process node, the node flow mode may also be configured in at least three ways, namely, automatic completion, confirmation by a single person for completion, and confirmation by a plurality of persons for completion. For example, when the work task corresponding to the linkage process node may be associated with one or more third-party platforms, one of the above flow modes may be configured for the node in the configuration stage. When the node flow mode is configured as automatic completion, it indicates that when the node receives the feedback information from the third-party platform and determines that the information is consistent with the preset feedback information, the work flow of the project is automatically driven to a next node. When the node flow mode is configured as confirmation by a single person for completion, regardless of whether the work task of the node involves one or more third-party platforms, as long as the node receives feedback information from one third-party platform and determines that the information is consistent with the preset feedback information, the work flow of the project is driven to a next node. Correspondingly, when the node flow mode is configured as confirmation by a plurality of persons for completion, and the work task of the node involves a plurality of third-party platforms, only when feedback information is received from all the platforms and all the information is consistent with the preset feedback information, the work flow of the project is driven to a next node.

According to the technical solution of this embodiment, in the project promotion stage, the linkage process node is identified and the corresponding node attribute information is retrieved, for example, to determine the third-party platform related to the node, the work task of the node is processed with reliance on the third-party platform, and finally, the compliance item is marked based on feedback from the third-party platform, to implement cross-system linkage for related compliance evaluation work.

Figure 7:
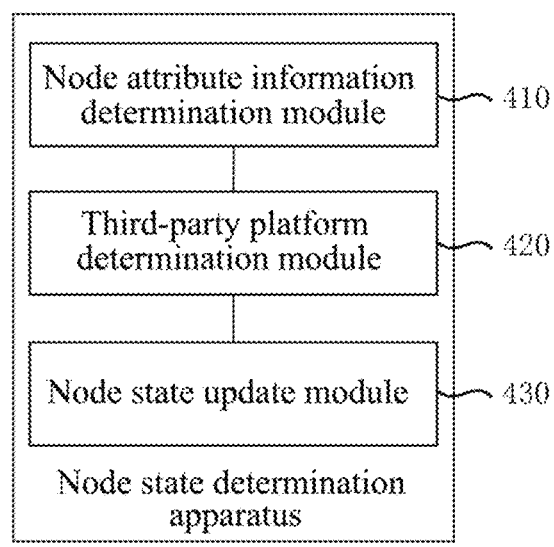
FIG. 7 is a block diagram of a structure of a node state determination apparatus according to an embodiment of the present disclosure.

FIG. 7 is a block diagram of a structure of a node state determination apparatus according to an embodiment of the present disclosure. The apparatus can perform the node state determination method provided in any embodiment of the present disclosure, and has corresponding functional modules and beneficial effects for performing the method. As shown in FIG. 7, the apparatus includes: a node attribute information determination module 410, a third-party platform determination module 420, and a node state update module 430.

The node attribute information determination module 410 is configured to determine node attribute information of a linkage process node if a current process node is the linkage process node.

The third-party platform determination module 420 is configured to determine at least one third-party platform based on the node attribute information, and send task information corresponding to the linkage process node to the at least one third-party platform, such that the at least one third-party platform processes the task information.

The node state update module 430 is configured to receive feedback information from the at least one third-party platform, and update a node state of the current process node to a target state based on the feedback information.

Based on the above plurality of technical solutions, the node state determination apparatus further includes a node attribute information update module.

The node attribute information update module is configured to configure a linkage identifier for at least one process node in a project flow, and update the node attribute information based on the linkage identifier, to determine that the current process node is the linkage process node based on the linkage identifier in the node attribute information.

For example, the node attribute information update module is further configured to: configure an evaluation switch for the at least one process node; and adjust a state of the evaluation switch to a first state, and use the first state as the linkage identifier.

For example, the node attribute information update module is further configured to: select the at least one process node through a trigger operation on a checkbox control in a display interface; and configure an evaluation switch for the at least one process node, adjust a state of the evaluation switch to a first state, and use the first state as the linkage identifier.

Based on the above plurality of technical solutions, the node state determination apparatus further includes a target content configuration module.

The target content configuration module is configured to configure target content for at least one target field of node attribute information of the at least one linkage process node.

Based on the above plurality of technical solutions, the target field includes a node name field, a node form field, and a link field.

For example, the target content configuration module is further configured to: add node name information to the node name field; set a linkage result configuration item for the node form field, to determine a configuration choice for the result configuration item based on the feedback information from the at least one third-party platform; and set at least one third-party platform link for the link field, to jump to a corresponding third-party platform based on the at least one third-party platform link and determine execution user information based on role information in the third-party platform link.

Based on the above plurality of technical solutions, the node attribute information determination module 410 includes a linkage process node determination unit and a node attribute information retrieval unit.

The linkage process node determination unit is configured to determine that the current process node is the linkage process node if the current process node is provided with a linkage identifier, where the current process node is a task flow node in a project flow.

The node attribute information retrieval unit is configured to retrieve the node attribute information of the linkage process node, where the node attribute information includes at least one third-party platform associated with the current process node.

Based on the above plurality of technical solutions, the third-party platform determination module 420 includes a third-party platform determination unit and an execution user information determination unit.

The third-party platform determination unit is configured to determine at least one third-party platform corresponding to the linkage process node based on the node attribute information.

The execution user information determination unit is configured to send the task information to the at least one third-party platform, and determine execution user information in the third-party platform based on role information in the node attribute information, to process the task information based on the execution user information.

Based on the above plurality of technical solutions, the target state is a completed state.

Based on the above plurality of technical solutions, the node state update module 430 includes a marking unit and a node state update unit.

The marking unit is configured to mark a compliance item of a linkage result configuration item in the node attribute information if the feedback information received from the at least one third-party platform is consistent with preset feedback information.

The node state update unit is configured to update the node state of the current process node to a completed state if it is detected that the compliance item has been marked.

According to the technical solution provided in this embodiment, if the current process node is the linkage process node, the node attribute information of the linkage process node is determined to clarify work content related to a service in this section; the at least one third-party platform is determined based on the node attribute information, and the task information corresponding to the linkage process node is sent to the at least one third-party platform, such that the at least one third-party platform processes the task information; and for example, the feedback information is received from the at least one third-party platform, and the node state of the current process node is updated to the target state based on the feedback information, such that work information is transmitted and synchronized between a plurality of platforms in an automated manner. This not only enables the third-party platform to directly drive the related node of the original project process management platform to implement cross-system linkage between the plurality of platforms, but also avoids a complex process of the user performing repeated switching between the plurality of platforms and inputting information a plurality of times when processing the task, thereby improving the efficiency of project promotion.

The node state determination apparatus provided in this embodiment of the present disclosure can perform the node state determination method provided in any embodiment of the present disclosure, and has corresponding functional modules and beneficial effects for performing the method.

It is worth noting that the plurality of units and modules included in the above apparatus are obtained through division merely according to functional logic, but are not limited to the above division, as long as corresponding functions can be implemented. In addition, the specific names of the plurality of function units are merely used for mutual distinguishing, and are not used to limit the protection scope of the embodiments of the present disclosure.

Figure 8:
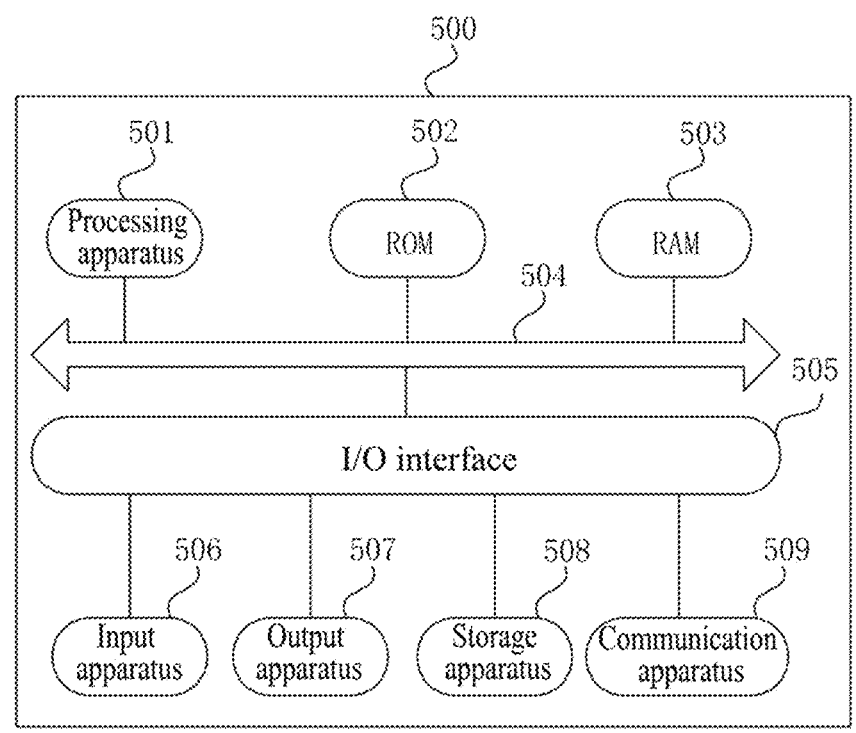
FIG. 8 is a schematic diagram of a structure of an electronic device according to an embodiment of the present disclosure.

FIG. 8 is a schematic diagram of a structure of an electronic device according to an embodiment of the present disclosure. Reference is made to FIG. 8 below, which is a schematic diagram of a structure of an electronic device (such as a terminal device or a server in FIG. 8) 500 suitable for implementing an embodiment of the present disclosure. The terminal device in this embodiment of the present disclosure may include but is not limited to mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 8 is merely an example, and shall not impose any limitation on the function and scope of use of the embodiments of the present disclosure.

As shown in FIG. 8, the electronic device 400 may include a processing apparatus (for example, a central processor or a graphics processor) 501 that may perform a variety of appropriate actions and processing in accordance with a program stored in a read-only memory (ROM) 502 or a program loaded from a storage apparatus 506 into a random access memory (RAM) 503. The RAM 503 further stores various programs and data required for the operation of the electronic device 500. The processing apparatus 501, the ROM 502, and the RAM 503 are connected to each other through a bus 504. An edit/output (I/O) interface 505 is also connected to the bus 504.

Generally, the following apparatuses may be connected to the I/O interface 505: an editing apparatus 506 including, for example, a touchscreen, a touchpad, a keyboard, a mouse, a camera, a microphone, an accelerometer, and a gyroscope; an output apparatus 507 including, for example, a liquid crystal display (LCD), a speaker, and a vibrator; the storage apparatus 506 including, for example, a tape and a hard disk; and a communication apparatus 509. The communication apparatus 509 may allow the electronic device 500 to perform wireless or wired communication with other devices to exchange data. Although FIG. 8 shows the electronic device 500 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 509 and installed, from the storage apparatus 506, or installed from the ROM 502. When the computer program is executed by the processing apparatus 501, the above functions defined in the method of the embodiment of the present disclosure are performed.

The names of messages or information exchanged between a plurality of apparatuses in the implementations of the present disclosure are used for illustrative purposes only, and are not used to limit the scope of these messages or information.

The electronic device provided in this embodiment of the present disclosure and the node state determination method provided in the above embodiment belong to the same inventive concept. For the technical details not described in detail in this embodiment, reference may be made to the above embodiment, and this embodiment and the above embodiment have the same beneficial effects.

An embodiment of the present disclosure provides a computer storage medium having stored thereon a computer program that, when executed by a processor, causes the node state determination method described in the above embodiment to be implemented.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM) (or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, a client and a server may communicate using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, causes the electronic device to:

determine node attribute information of a linkage process node if a current process node is the linkage process node;

determine at least one third-party platform based on the node attribute information, and send task information corresponding to the linkage process node to the at least one third-party platform, such that the at least one third-party platform processes the task information; and receive feedback information from the at least one third-party platform, and update a node state of the current process node to a target state based on the feedback information.

The computer program code for performing the operations in the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be entirely executed on a computer of a user, partially executed on a computer of a user, executed as an independent software package, partially executed on a computer of a user and partially executed on a remote computer, or entirely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowcharts and the block diagrams in the accompanying drawings illustrate possible system architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be executed substantially in parallel, or may sometimes be executed in a reverse order, depending on a function involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. Names of the units do not constitute a limitation on the units in some cases, for example, a first obtaining unit may alternatively be described as "a unit for obtaining at least two Internet protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatus, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to one or more embodiments of the present disclosure, [Example 1] provides a node state determination method, the method including:
- determining node attribute information of a linkage process node if a current process node is the linkage process node;
- determining at least one third-party platform based on the node attribute information, and sending task information corresponding to the linkage process node to the at least one third-party platform, such that the at least one third-party platform processes the task information; and
- receiving feedback information from the at least one third-party platform, and updating a node state of the current process node to a target state based on the feedback information.

According to one or more embodiments of the present disclosure, [Example 2] provides a node state determination method, the method further including:
- for example, configuring a linkage identifier for at least one process node in a project flow, and updating the node attribute information based on the linkage identifier, to determine that the current process node is the linkage process node based on the linkage identifier in the node attribute information.

According to one or more embodiments of the present disclosure, [Example 3] provides a node state determination method, the method further including:
- for example, configuring an evaluation switch for the at least one process node; and
- adjusting a state of the evaluation switch to a first state, and using the first state as the linkage identifier.

According to one or more embodiments of the present disclosure, [Example 4] provides a node state determination method, the method further including:
- for example, selecting the at least one process node through a trigger operation on a checkbox control in a display interface; and
- configuring an evaluation switch for the at least one process node, adjusting a state of the evaluation switch to a first state, and using the first state as the linkage identifier.

According to one or more embodiments of the present disclosure, [Example 5] provides a node state determination method, the method further including:
- for example, configuring target content for at least one target field of node attribute information of the at least one linkage process node.

According to one or more embodiments of the present disclosure, [Example 6] provides a node state determination method, the method further including:
- for example, the target field including a node name field, a node form field, and a link field;
- adding node name information to the node name field;
- setting a linkage result configuration item for the node form field, to determine a configuration choice for the result configuration item based on the feedback information from the at least one third-party platform; and
- setting at least one third-party platform link for the link field, to jump to a corresponding third-party platform based on the at least one third-party platform link and determine execution user information based on role information in the third-party platform link.

According to one or more embodiments of the present disclosure, [Example 7] provides a node state determination method, the method further including:
- for example, determining the current process node as the linkage process node if the current process node is provided with a linkage identifier, where the current process node is a task flow node in a project flow; and
- retrieving the node attribute information of the linkage process node, where the node attribute information includes at least one third-party platform associated with the current process node.

According to one or more embodiments of the present disclosure, [Example 8] provides a node state determination method, the method further including:
- for example, determining at least one third-party platform corresponding to the linkage process node based on the node attribute information; and
- sending the task information to the at least one third-party platform, and determining execution user information in the third-party platform based on role information in the node attribute information, to process the task information based on the execution user information.

According to one or more embodiments of the present disclosure, [Example 9] provides a node state determination method, the method further including:
- for example, marking a compliance item of a linkage result configuration item in the node attribute information if the feedback information received from the at least one third-party platform is consistent with preset feedback information; and
- updating the node state of the current process node to a completed state if it is detected that the compliance item has been marked.

According to one or more embodiments of the present disclosure, [Example 10] provides a node state determination apparatus, the apparatus including:
- a node attribute information determination module configured to determine node attribute information of a linkage process node if a current process node is the linkage process node; a third-party platform determination module configured to determine at least one third-party platform based on the node attribute information, and send task information corresponding to the linkage process node to the at least one third-party platform, such that the at least one third-party platform processes the task information; and
- a node state update module configured to receive feedback information from the at least one third-party platform, and update a node state of the current process node to a target state based on the feedback information.

In addition, although a plurality of operations are depicted in a specific order, it should be understood as requiring these operations to be performed in the specific order shown or in a sequential order. Under specific circumstances, multitasking and parallel processing may be advantageous. Similarly, although several specific implementation details are included in the above discussions, these details should not be construed as limiting the scope of the present disclosure. Some features that are described in the context of separate embodiments may alternatively be implemented in combination in a single embodiment. In contrast, a plurality of features described in the context of a single embodiment may alternatively be implemented in a plurality of embodiments individually or in any suitable subcombination.

The invention claimed is:

1. A node state determination method, comprising:
   determining node attribute information of a linkage process node in response to determining a current process node as the linkage process node;
   determining at least one third-party platform based on the node attribute information, and sending task information corresponding to the linkage process node to the at least one third-party platform, such that the at least one third-party platform processes the task information; and
   receiving feedback information from the at least one third-party platform, and updating a node state of the current process node to a target state based on the feedback information.

2. The node state determination method according to claim 1, wherein before the determining node attribute information of a linkage process node in response to determining a current process node as the linkage process node, the method further comprises:
   configuring a linkage identifier for at least one process node in a project flow, and updating the node attribute information based on the linkage identifier, to determine the current process node as the linkage process node based on the linkage identifier in the node attribute information.

3. The node state determination method according to claim 2, wherein the configuring a linkage identifier for at least one process node in a project flow comprises:
   configuring an evaluation switch for the at least one process node; and
   adjusting a state of the evaluation switch to a first state, and using the first state as the linkage identifier.

4. The node state determination method according to claim 2, wherein the configuring a linkage identifier for at least one process node in a project flow comprises:
   selecting the at least one process node through a trigger operation on a checkbox control in a display interface; and
   configuring an evaluation switch for the at least one process node, adjusting a state of the evaluation switch to a first state, and using the first state as the linkage identifier.

5. The node state determination method according to claim 2, further comprising:
   configuring target content for at least one target field of node attribute information of the at least one linkage process node.

6. The node state determination method according to claim 5, wherein the target field comprises a node name field, a node form field, and a link field, and the configuring target content for at least one target field of node attribute information of the at least one linkage process node comprises:
   adding node name information to the node name field;
   setting a linkage result configuration item for the node form field, to determine a configuration choice for the result configuration item based on the feedback information from the at least one third-party platform; and
   setting at least one third-party platform link for the link field, to jump to a corresponding third-party platform based on the at least one third-party platform link and determine execution user information based on role information in the third-party platform link.

7. The node state determination method according to claim 1, wherein the determining node attribute information of a linkage process node in response to determining a current process node as the linkage process node comprises:
   determining the current process node as the linkage process node in response to determining that the current process node is provided with a linkage identifier, wherein the current process node is a task flow node in a project flow; and
   retrieving the node attribute information of the linkage process node, wherein the node attribute information comprises at least one third-party platform associated with the current process node.

8. The node state determination method according to claim 1, wherein the determining at least one third-party platform based on the node attribute information, and sending task information corresponding to the linkage process node to the at least one third-party platform, such that the at least one third-party platform processes the task information comprises:
   determining at least one third-party platform corresponding to the linkage process node based on the node attribute information; and
   sending the task information to the at least one third-party platform, and determining execution user information in the third-party platform based on role information in the node attribute information, to process the task information based on the execution user information.

9. The node state determination method according to claim 1, wherein the target state is a completed state, and the receiving feedback information from the at least one third-party platform, and updating a node state of the current process node to a target state based on the feedback information comprises:
   marking a compliance item of a linkage result configuration item in the node attribute information in response to the feedback information received from the at least one third-party platform being consistent with preset feedback information; and
   updating the node state of the current process node to the completed state in response to detecting that the compliance item has been marked.

10. An electronic device, comprising:
    one or more processors; and
    a storage apparatus configured to store one or more programs,
    wherein the one or more programs, when executed by the one or more processors, cause the one or more processors to:
    determine node attribute information of a linkage process node in response to determining a current process node as the linkage process node;

determine at least one third-party platform based on the node attribute information, and send task information corresponding to the linkage process node to the at least one third-party platform, such that the at least one third-party platform processes the task information; and receive feedback information from the at least one third-party platform, and update a node state of the current process node to a target state based on the feedback information.

11. The electronic device according to claim 10, wherein before the determining node attribute information of a linkage process node in response to determining a current process node as the linkage process node, the one or more processors are further caused to:

configure a linkage identifier for at least one process node in a project flow, and update the node attribute information based on the linkage identifier, to determine the current process node as the linkage process node based on the linkage identifier in the node attribute information.

12. The electronic device according to claim 11, wherein the one or more processors are caused to configure a linkage identifier for at least one process node in a project flow by being caused to:

configure an evaluation switch for the at least one process node; and adjust a state of the evaluation switch to a first state, and use the first state as the linkage identifier.

13. The electronic device according to claim 11, wherein the one or more processors are caused to configure a linkage identifier for at least one process node in a project flow by being caused to:

select the at least one process node through a trigger operation on a checkbox control in a display interface; and configure an evaluation switch for the at least one process node, adjust a state of the evaluation switch to a first state, and use the first state as the linkage identifier.

14. The electronic device according to claim 11, wherein the one or more processors are further caused to:

configure target content for at least one target field of node attribute information of the at least one linkage process node.

15. The electronic device according to claim 14, wherein the target field comprises a node name field, a node form field, and a link field, and the one or more processors are causes to configure target content for at least one target field of node attribute information of the at least one linkage process node by being caused to:

add node name information to the node name field;

set a linkage result configuration item for the node form field, to determine a configuration choice for the result configuration item based on the feedback information from the at least one third-party platform; and set at least one third-party platform link for the link field, to jump to a corresponding third-party platform based on the at least one third-party platform link and determine execution user information based on role information in the third-party platform link.

16. The electronic device according to claim 10, wherein the one or more processors are caused to determine node attribute information of a linkage process node in response to determining a current process node as the linkage process node by being caused to:

determine the current process node as the linkage process node in response to determining that the current process node is provided with a linkage identifier, wherein the current process node is a task flow node in a project flow; and retrieve the node attribute information of the linkage process node, wherein the node attribute information comprises at least one third-party platform associated with the current process node.

17. The electronic device according to claim 10, wherein the one or more processors are caused to determine at least one third-party platform based on the node attribute information, and send task information corresponding to the linkage process node to the at least one third-party platform, such that the at least one third-party platform processes the task information by being caused to:

determine at least one third-party platform corresponding to the linkage process node based on the node attribute information; and send the task information to the at least one third-party platform, and determine execution user information in the third-party platform based on role information in the node attribute information, to process the task information based on the execution user information.

18. The electronic device according to claim 10, wherein the target state is a completed state, and the one or more processors are caused to receive feedback information from the at least one third-party platform, and update a node state of the current process node to a target state based on the feedback information by being caused to:

mark a compliance item of a linkage result configuration item in the node attribute information in response to the feedback information received from the at least one third-party platform being consistent with preset feedback information; and update the node state of the current process node to the completed state in response to detecting that the compliance item has been marked.

19. A non-transitory storage medium comprising computer-executable instructions that, when executed by a computer processor, are configured to perform:

determining node attribute information of a linkage process node in response to determining a current process node as the linkage process node;

determining at least one third-party platform based on the node attribute information, and sending task information corresponding to the linkage process node to the at least one third-party platform, such that the at least one third-party platform processes the task information; and receiving feedback information from the at least one third-party platform, and updating a node state of the current process node to a target state based on the feedback information.

20. The non-transitory storage medium according to claim 19, wherein before the determining node attribute information of a linkage process node in response to determining a current process node as the linkage process node, the method further comprises:

configuring a linkage identifier for at least one process node in a project flow, and updating the node attribute information based on the linkage identifier, to determine the current process node as the linkage process node based on the linkage identifier in the node attribute information.

* * * * *